US012803884B2

(12) United States Patent
Sundararajan et al.

(10) Patent No.: US 12,803,884 B2
(45) Date of Patent: Nov. 17, 2026

(54) PRECODED REFERENCE SIGNAL FOR MODEL MONITORING FOR ML-BASED CSI FEEDBACK

(71) Applicant: QUALCOMM Incorporated, San Diego, CA (US)

(72) Inventors: Jay Kumar Sundararajan, San Diego, CA (US); Chenxi Hao, Beijing (CN); June Namgoong, San Diego, CA (US); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 36 days.

(21) Appl. No.: 19/103,816

(22) PCT Filed: Nov. 4, 2022

(86) PCT No.: PCT/CN2022/129980
§ 371 (c)(1),
(2) Date: Feb. 13, 2025

(87) PCT Pub. No.: WO2024/092743
PCT Pub. Date: May 10, 2024

(65) Prior Publication Data
US 2026/0052075 A1 Feb. 19, 2026

(51) Int. Cl.
*G06F 15/173* (2006.01)
*H04B 7/06* (2006.01)
(Continued)

(52) U.S. Cl.
CPC ........... *H04L 41/16* (2013.01); *H04B 7/0626* (2013.01); *H04L 25/0202* (2013.01)

(58) Field of Classification Search
CPC ........ H04B 7/0421; G06N 3/045; G06N 3/08; G06N 3/084; H04L 25/0224; H04L 25/0254
See application file for complete search history.

(56) References Cited

U.S. PATENT DOCUMENTS

2020/0343985 A1 10/2020 O'Shea et al.
2021/0273707 A1 9/2021 Yoo et al.
(Continued)

FOREIGN PATENT DOCUMENTS

CN 113691288 A 11/2021

OTHER PUBLICATIONS

CATT: "Discussion on Other Aspects on AI/ML for CSI Feedback", 3GPP TSG RAN WG1 #109-e, R1-2203452, e-Meeting, May 9, 2022-May 20, 2022, May 20, 2022, 6 pages.
(Continued)

*Primary Examiner* — Padma Mundur
(74) *Attorney, Agent, or Firm* — Procopio, Cory, Hargreaves & Savitch LLP

(57) ABSTRACT

A method for wireless communication at a user equipment (UE) and related apparatus are provided. In the method, the UE receives a precoded pilot signal from a network entity. The precoded pilot signal includes a pilot signal that is precoded with a precoder based on a machine-learning (ML) model. The UE further reports an ML model performance monitoring result, including a comparison between the target channel estimation and the reconstructed channel estimation for a channel between the UE and the network entity based on the precoded pilot signal. The target channel estimation may be based on a target channel station information (CSI). The method allows the UE to monitor the performance of an ML model without the overhead of conveying the target CSI to the network entity. Hence, it improves the efficiency and reliability of wireless communication.

19 Claims, 13 Drawing Sheets

(51) Int. Cl.
*H04L 25/02* (2006.01)
*H04L 41/16* (2022.01)

(56) References Cited

U.S. PATENT DOCUMENTS

| | | | | |
|---|---|---|---|---|
| 2021/0306049 | A1 | 9/2021 | Kim et al. | |
| 2025/0007583 | A1 * | 1/2025 | Chi | H04W 72/12 |
| 2025/0184768 | A1 * | 6/2025 | Wang | H04W 24/02 |

OTHER PUBLICATIONS

International Search Report and Written Opinion—PCT/CN2022/129980—ISA/CN—Jul. 26, 2023—7 pages.

* cited by examiner

PRECODED REFERENCE SIGNAL FOR MODEL MONITORING FOR ML-BASED CSI FEEDBACK

CROSS-REFERENCE TO RELATED APPLICATION

This application is a 371 National Stage of PCT Application No. PCT/CN2022/129980, filed on Nov. 4, 2022, entitled "PRECODED REFERENCE SIGNAL FOR MODEL MONITORING FOR ML-BASED CSI FEEDBACK", and assigned to the assignee hereof. The disclosure of the prior Application is considered part of and is incorporated by reference into this Patent Application.

TECHNICAL FIELD

The present disclosure relates generally to communication systems, and more particularly, to wireless communication with a precoded reference signal for model monitoring for machine-learning (ML) based channel station information (CSI) feedback.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus may include memory and at least one processor coupled to the memory. Based at least in part on information stored in the memory, the at least one processor may be configured to receive a precoded pilot signal from a network entity. The precoded pilot signal may include a pilot signal that is precoded with an ML model based precoder. The at least one processor may be further configured to report an ML model performance monitoring result. The ML model performance monitoring result may include a comparison between a target channel estimation and a reconstructed channel estimation for a channel between the UE and the network entity based on the precoded pilot signal.

In an aspect of the disclosure, a method, a computer-readable medium, and an apparatus are provided for wireless communication at a network entity. The apparatus may include memory and at least one processor coupled to the memory. Based at least in part on information stored in the memory, the at least one processor may be configured to transmit a precoded pilot signal to a UE. The precoded pilot signal may include a pilot signal precoded with a precoder based on an ML model. The at least one processor may be further configured to receive an ML model performance monitoring result from the UE. The ML model performance monitoring result may include a comparison between a target channel estimation and a reconstructed channel estimation for a channel between the UE and the network entity based on the precoded pilot signal.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
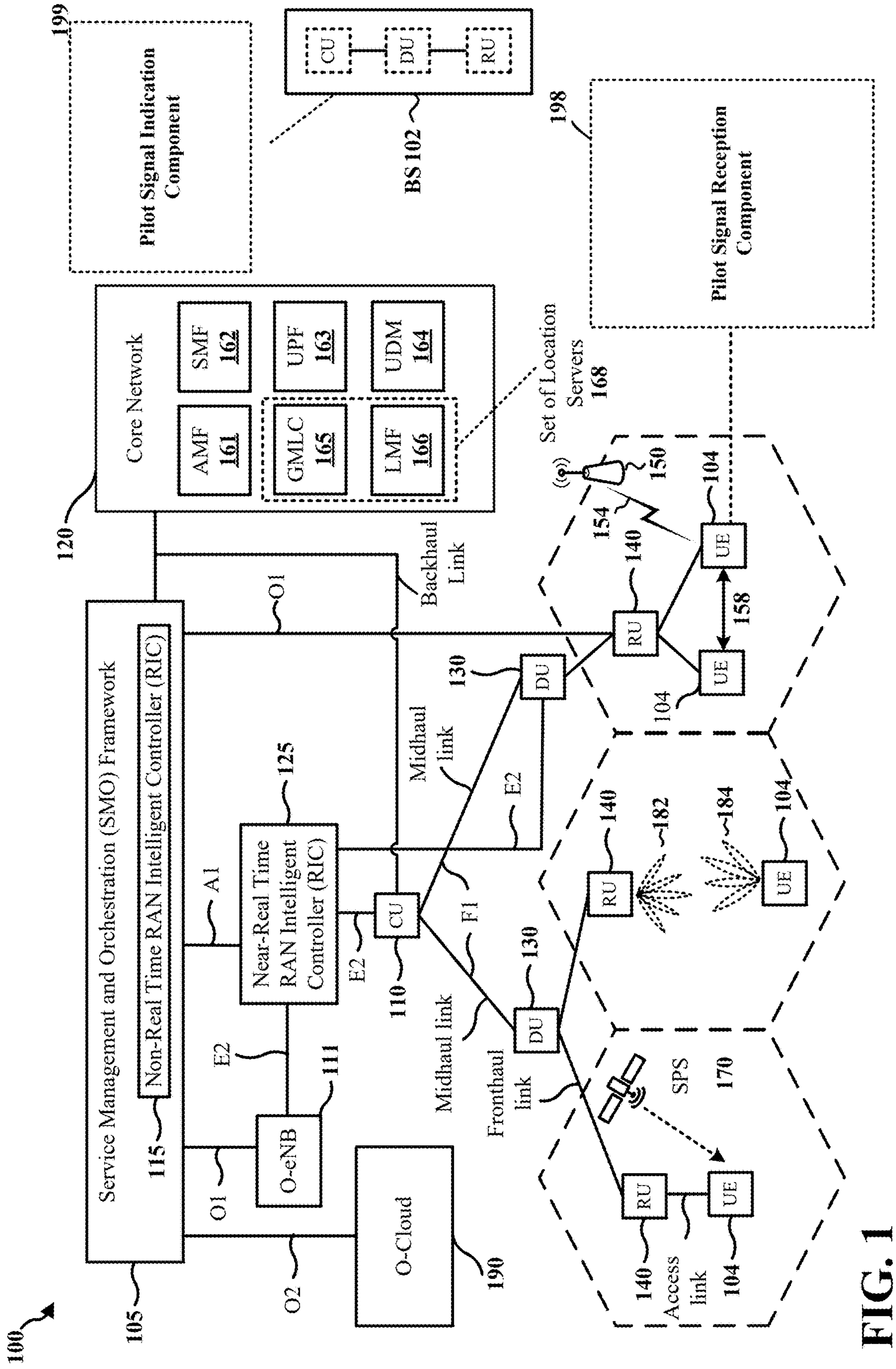
FIG. 1 is a diagram illustrating an example of a wireless communication system and an access network.

In wireless communication, a UE may use an ML model to encode data, such as CSI, and transmit the encoded data to the base station. The base station may decode the encoded data using another ML model to obtain the original data. The use of the model may enable a compression of the CSI to reduce signaling overhead. The performance of the ML models may be monitored to ensure the integrity of the wireless communication. However, conveying the original data between the UE and the base station, in order to monitor the ML model performance, may incur significant communication overhead. Aspects presented herein include methods and apparatus that enable a UE to monitor the performance of an ML model without the overhead of conveying the original data, such as original CSI, to the network entity. Hence, it improves the efficiency and reliability of wireless communication. As presented herein, in one aspect, a UE may receive, from a network entity, a precoded pilot signal, the precoded pilot signal comprising a pilot signal that is precoded with an ML model based precoder. The UE may further report an ML model performance monitoring result comprising a comparison between a target channel estimation and a reconstructed channel estimation for a channel between the UE and the network entity based on the precoded pilot signal.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a pilot signal reception component 198. The pilot signal reception component 198 may be configured to receive a precoded pilot signal from a network entity. The precoded pilot signal may include a pilot signal that is precoded with an ML model based precoder. The pilot signal reception component 198 may be further configured to report an ML model performance monitoring result. The ML model performance monitoring result may include a comparison between a target channel estimation and a reconstructed channel estimation for a channel between the UE and the network entity based on the precoded pilot signal. In certain aspects, the base station 102 may include a pilot signal indication component 199. The pilot signal indication component 199 may be configured to transmit a precoded pilot signal to a UE. The precoded pilot signal may include a pilot signal precoded with a precoder based on an ML model. The pilot signal indication component 199 may be further configured to receive an ML model performance monitoring result from the UE. The ML model performance monitoring result may include a comparison between a target channel estimation and a reconstructed channel estimation for a channel between the UE and the network entity based on the precoded pilot signal. Although the following description may be focused on 5G NR, the concepts described herein may be applicable to other similar areas, such as LTE, LTE-A, CDMA, GSM, and other wireless technologies.

Figures 2A, 2B, 2C, 2D:
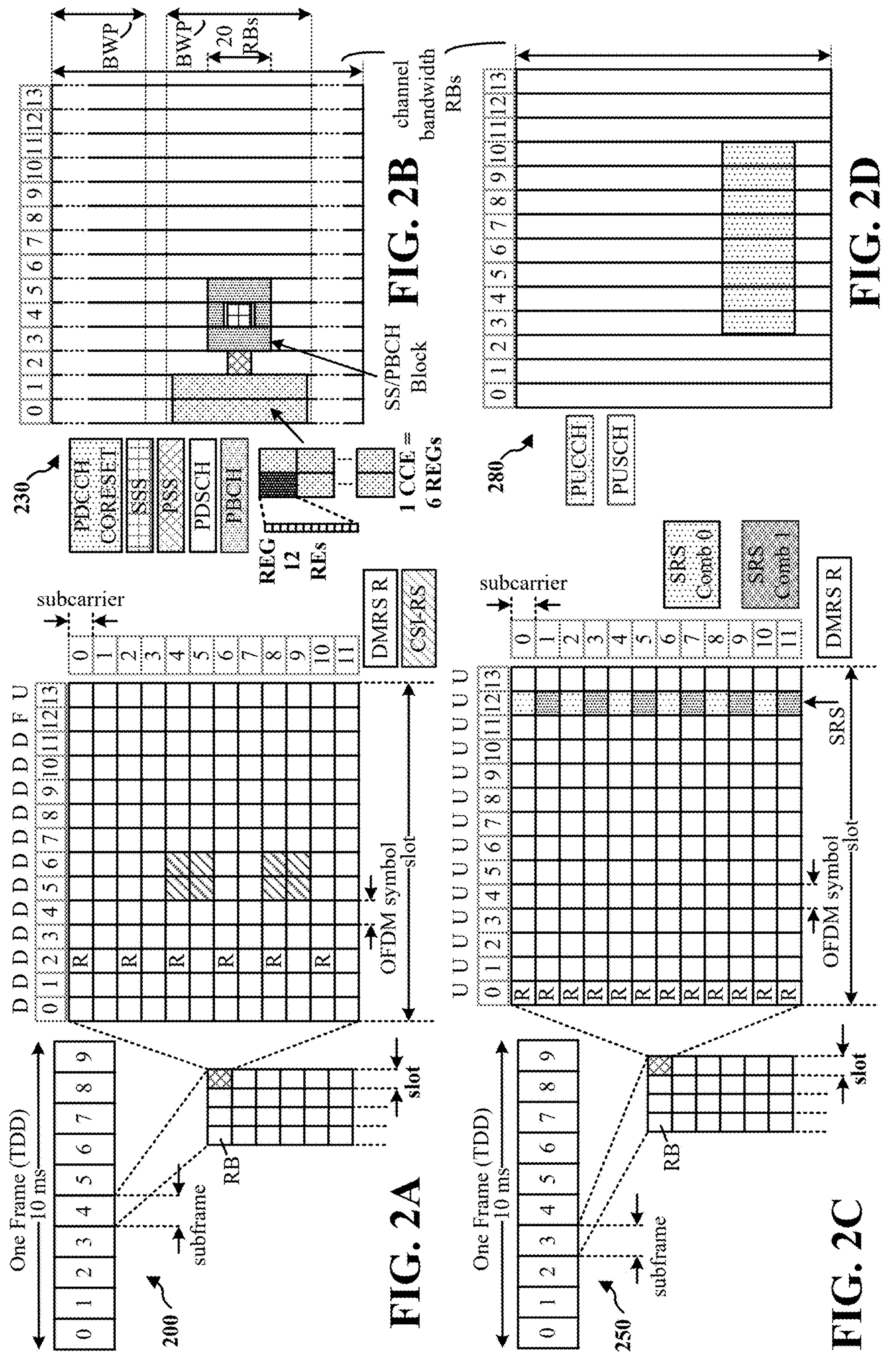
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology p, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
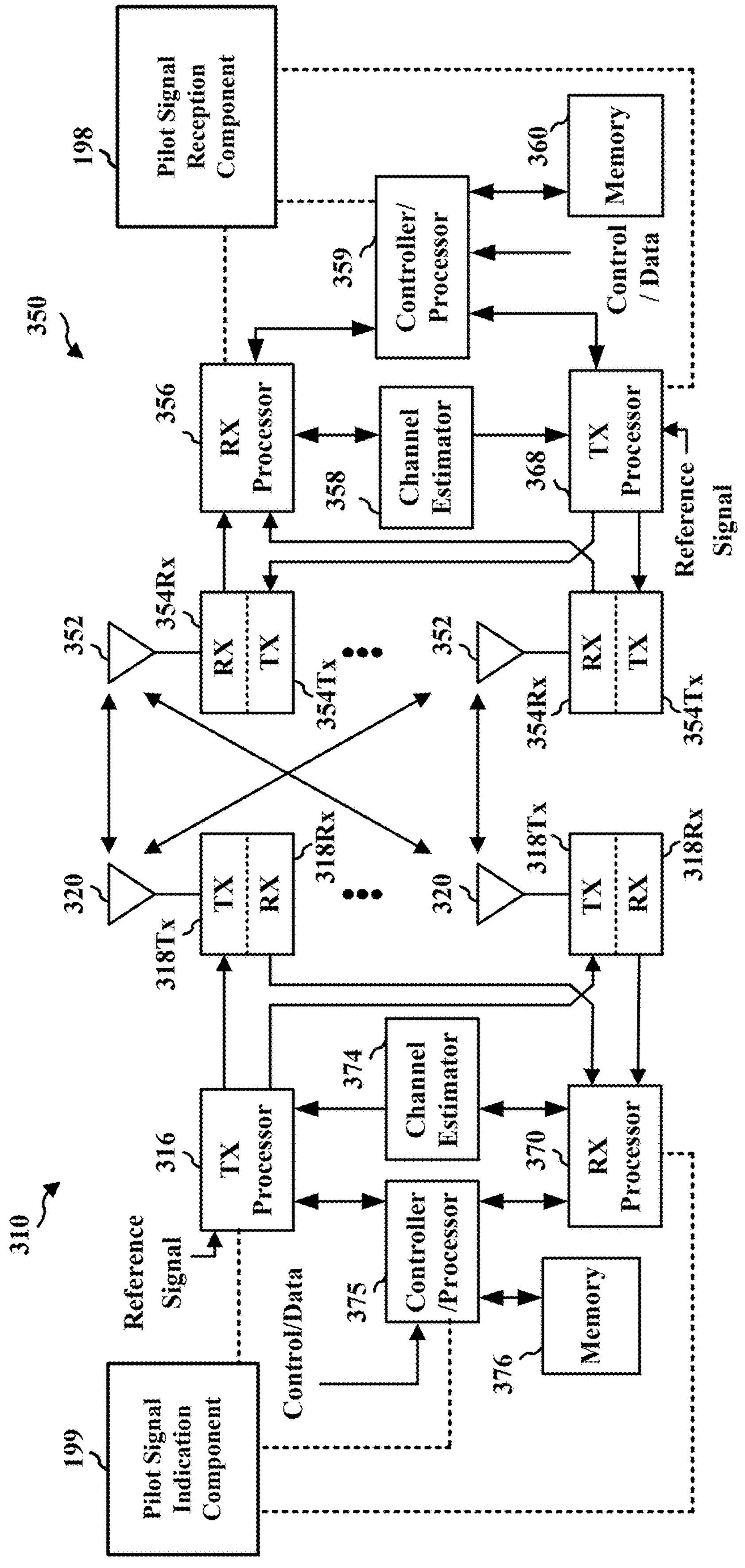
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the pilot signal reception component 198 of FIG. 1.

At least one of the TX processor 316, the RX processor 370, and the controller/processor 375 may be configured to perform aspects in connection with the pilot signal indication component 199 of FIG. 1.

The measurement and reporting of CSI may be used to adjust and improve communication, such as communication between a UE and network. In some aspects, such as high mobility situations, performance loss may occur based on channel variations that may occur more frequently than CSI updates. Although the CSI reporting rate can be increased, the increased uplink and downlink CSI overhead may reduce system throughput. Additionally, more frequent measurements, transmissions (e.g., of reference signals), and/or reporting uses additional battery power at a UE.

Reducing an overhead associated with channel state information (CSI) measurement and CSI reporting may increase a performance of a first network entity, such as a UE, and/or a second network entity, such as a base station or a component of a base station. For example, reducing a number of CSI measurements may increase a system throughput between the first network entity and the second network entity. However, reducing the number of CSI measurements may also reduce a quality of the CSI, as more CSI measurements may provide increased measurement accuracy, but may also increase the overhead.

Aspects presented herein help to improve CSI feedback with less associated overhead through model based CSI compression and reconstruction.

Figure 4:
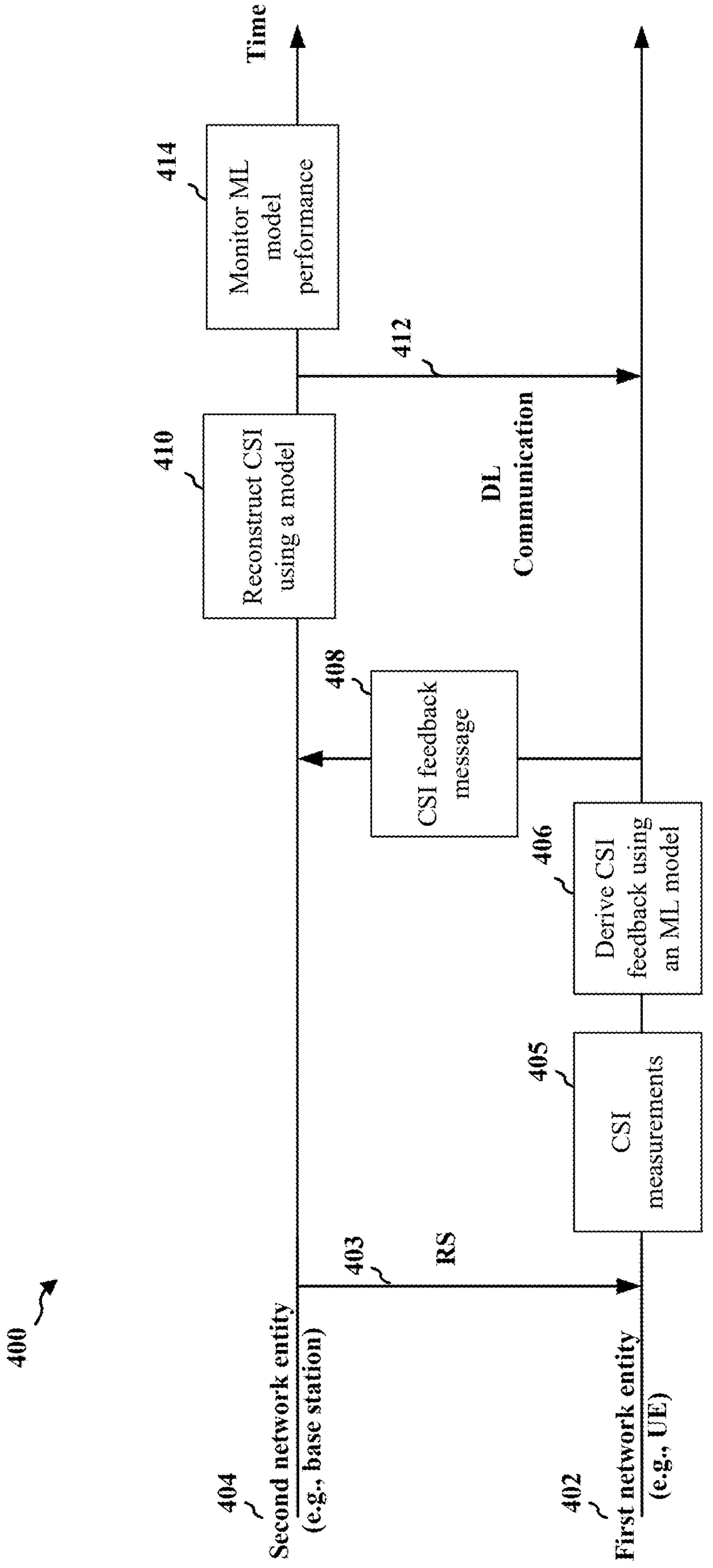
FIG. 4 is a call flow diagram illustrating a model-based channel compression technique.

FIG. 4 is a call flow diagram 400 illustrating a model-based CSI compression technique. At 403, a first network entity 402 (e.g., UE) receives and measures a reference signal 403 to obtain CSI measurements 405. At 406, the first network entity 402 (e.g., UE) may use an ML model to derive CSI feedback (e.g., use an ML model to compress CSI), and transmit a CSI feedback message (e.g., compressed CSI), at 408, to the second network entity 404 (e.g., base station). The second network entity 404 reconstructs the CSI using a corresponding model, e.g., ML model, maintained at the second network entity, at 410. The second network entity may then use the CSI to select one or more transmission parameters for communication 412 with the first network entity 402. As presented herein, the second network entity 414 may monitor the model performance, at 414. In some aspects, a model may change based on a local event at the first network entity 402. The local event may include a mobility change of the first network entity 402, a change in channel conditions (e.g., noise, interference, blockage), or a change of the physical device (e.g., battery life, power usage, device heating, etc.).

Figure 5:
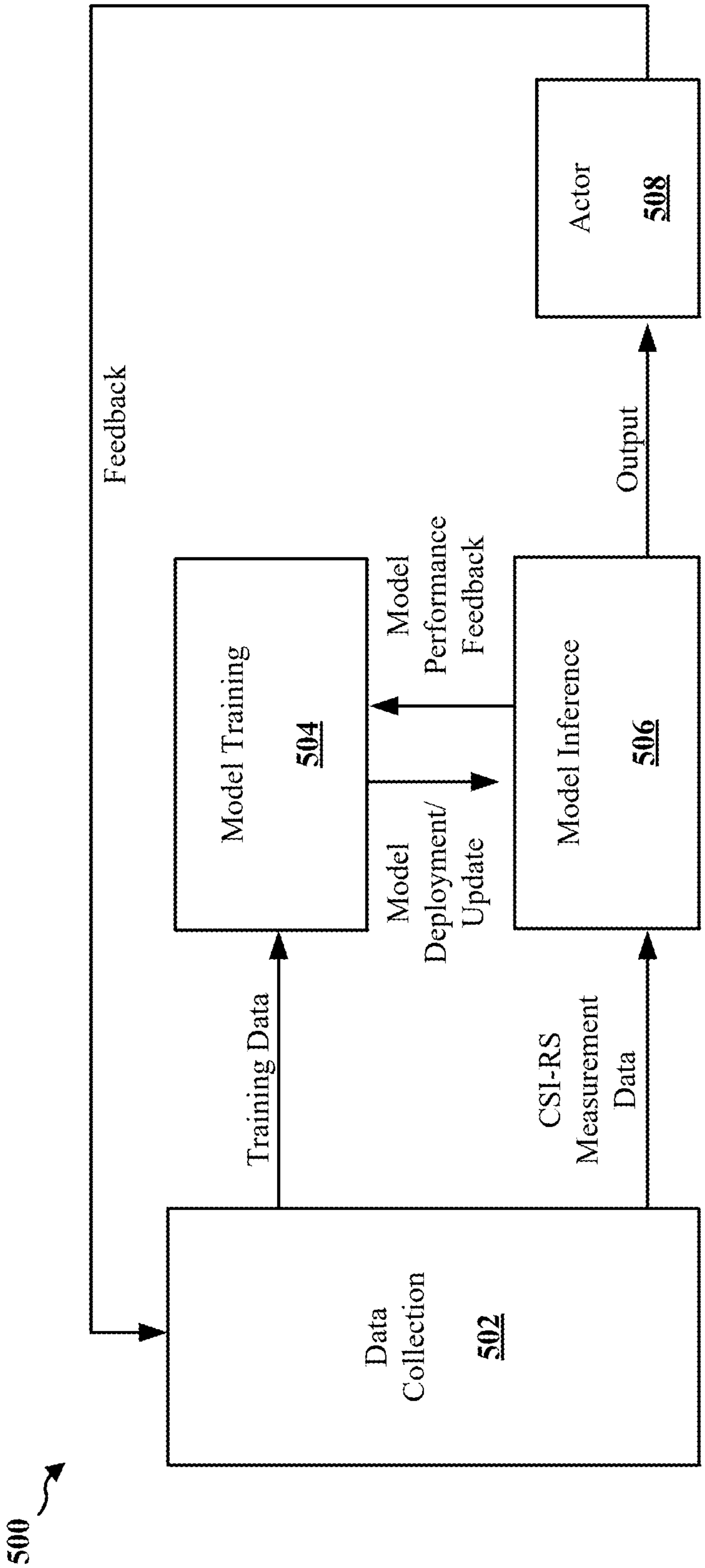
FIG. 5 is an example of an AI/ML algorithm for wireless communication.

FIG. 5 is an example of the AI/ML algorithm 500 of a method of wireless communication. The AI/ML algorithm 500 may include various functions including a data collection 502, a model training function 504, a model inference function 506, and an actor 508. In some aspects, the AI/ML algorithm may receive CSI measurements as input and provide a CSI feedback message (e.g., compressed CSI) as an output. In some aspects, the AI/ML algorithm may receive a CSI feedback message (e.g., compressed CSI) as an input, and may provide a reconstructed CSI as an output.

The data collection 502 may be a function that provides input data to the model training function 504 and the model inference function 506. For example, the data may include the information provided by one or more UEs based on a reference CSI-RS, and which may be further based on a non-reference CSI-RS. The data collection 502 function may include any form of data preparation, and it may not be specific to the implementation of the AI/ML algorithm (e.g., data pre-processing and cleaning, formatting, and transformation). The examples of input data may include, but not limited to, measurements, such as RSRP measurements from network entities including UEs or network nodes, feedback from the actor 508, output from another AI/ML model. The data collection 502 may include training data, which refers to the data to be sent as the input for the AI/ML model training function 504, and inference data, which refers to be sent as the input for the AI/ML model inference function 506.

The model training function 504 may be a function that performs the ML model training, validation, and testing, which may generate model performance metrics as part of the model testing procedure. The model training function 504 may also be responsible for data preparation (e.g., data pre-processing and cleaning, formatting, and transformation) based on the training data delivered or received from the data collection 502 function. The model training function 504 may deploy or update a trained, validated, and tested AI/ML model to the model inference function 506, and receive a model performance feedback from the model inference function 506.

The model inference function 506 may be a function that provides the AI/ML model inference output (e.g., predictions or decisions). The model inference function 506 may also perform data preparation (e.g., data pre-processing and cleaning, formatting, and transformation) based on the inference data delivered from the data collection 502 function. The output of the model inference function 506 may include the inference output of the AI/ML model produced by the model inference function 506. The details of the inference output may be use-case specific. As an example, the output may include denoising of compressed CSI.

The model performance feedback may refer to information derived from the model inference function 506 that may be suitable for the improvement of the AI/ML model trained in the model training function 504. The feedback from the actor 508 or other network entities (via the data collection 502 function) may be implemented for the model inference function 506 to create the model performance feedback.

The actor 508 may be a function that receives the output from the model inference function 506 and triggers or performs corresponding actions. The actor may trigger actions directed to network entities including the other network entities or itself. The actor 508 may also provide feedback information that the model training function 504 or the model interference function 506 to derive training or inference data or performance feedback. The feedback may be transmitted back to the data collection 502.

The network may use machine-learning algorithms, deep-learning algorithms, neural networks, reinforcement learning, regression, boosting, or advanced signal processing methods for aspects of wireless communication.

In some aspects described herein, the network may train one or more neural networks to learn dependence of measured qualities on individual parameters. Among others, examples of machine learning models or neural networks that may be comprised in the network entity include artificial neural networks (ANN); decision tree learning; convolutional neural networks (CNNs); deep learning architectures in which an output of a first layer of neurons becomes an input to a second layer of neurons, and so forth; support vector machines (SVM), e.g., including a separating hyperplane (e.g., decision boundary) that categorizes data; regression analysis; bayesian networks; genetic algorithms; Deep convolutional networks (DCNs) configured with additional pooling and normalization layers; and Deep belief networks (DBNs).

A machine learning model, such as an artificial neural network (ANN), may include an interconnected group of artificial neurons (e.g., neuron models), and may be a computational device or may represent a method to be performed by a computational device. The connections of the neuron models may be modeled as weights. Machine learning models may provide predictive modeling, adaptive control, and other applications through training via a dataset. The model may be adaptive based on external or internal information that is processed by the machine learning model. Machine learning may provide non-linear statistical data model or decision making and may model complex relationships between input data and output information.

A machine learning model may include multiple layers and/or operations that may be formed by concatenation of one or more of the referenced operations. Examples of operations that may be involved include extraction of various features of data, convolution operations, fully connected operations that may be activated or deactivated, compression, decompression, quantization, flattening, etc. As used herein, a "layer" of a machine learning model may be used to denote an operation on input data. For example, a convolution layer, a fully connected layer, and/or the like may be used to refer to associated operations on data that is input into a layer. A convolution A×B operation refers to an operation that converts a number of input features A into a number of output features B. "Kernel size" may refer to a number of adjacent coefficients that are combined in a dimension. As used herein, "weight" may be used to denote one or more coefficients used in the operations in the layers for combining various rows and/or columns of input data. For example, a fully connected layer operation may have an output y that is determined based at least in part on a sum of a product of input matrix x and weights A (which may be a matrix) and bias values B (which may be a matrix). The term "weights" may be used herein to generically refer to both weights and bias values. Weights and biases are examples of parameters of a trained machine learning model. Different layers of a machine learning model may be trained separately.

Machine learning models may include a variety of connectivity patterns, e.g., including any of feed-forward networks, hierarchical layers, recurrent architectures, feedback connections, etc. The connections between layers of a neural network may be fully connected or locally connected. In a fully connected network, a neuron in a first layer may communicate its output to each neuron in a second layer, and each neuron in the second layer may receive input from every neuron in the first layer. In a locally connected network, a neuron in a first layer may be connected to a limited number of neurons in the second layer. In some aspects, a convolutional network may be locally connected and configured with shared connection strengths associated with the inputs for each neuron in the second layer. A locally connected layer of a network may be configured such that each neuron in a layer has the same, or similar, connectivity pattern, but with different connection strengths.

A machine learning model or neural network may be trained. For example, a machine learning model may be trained based on supervised learning. During training, the machine learning model may be presented with input that the model uses to compute to produce an output. The actual output may be compared to a target output, and the difference may be used to adjust parameters (such as weights and biases) of the machine learning model in order to provide an output closer to the target output. Before training, the output may be incorrect or less accurate, and an error, or difference, may be calculated between the actual output and the target output. The weights of the machine learning model may then be adjusted so that the output is more closely aligned with the target. To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error or to move the output closer to the target. This manner of adjusting the weights may be referred to as back propagation through the neural network. The process may continue until an achievable error rate stops decreasing or until the error rate has reached a target level.

The machine learning models may include computational complexity and substantial processor for training the machine learning model. An output of one node is connected as the input to another node. Connections between nodes may be referred to as edges, and weights may be applied to the connections/edges to adjust the output from one node that is applied as input to another node. Nodes may apply thresholds in order to determine whether, or when, to provide output to a connected node. The output of each node may be calculated as a non-linear function of a sum of the inputs to the node. The neural network may include any number of nodes and any type of connections between nodes. The neural network may include one or more hidden nodes. Nodes may be aggregated into layers, and different layers of the neural network may perform different kinds of transformations on the input. A signal may travel from input at a first layer through the multiple layers of the neural network to output at the last layer of the neural network and may traverse layers multiple times.

Figure 6A:
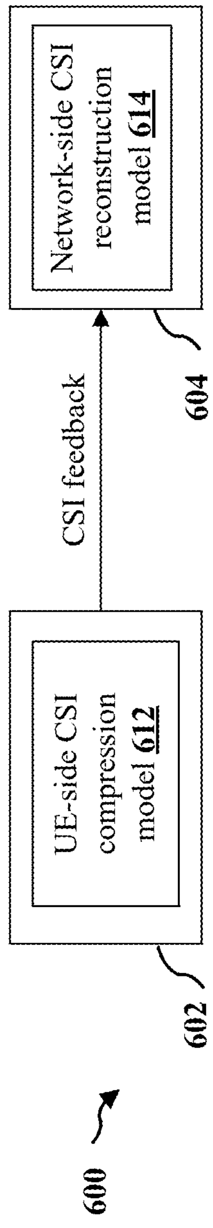
FIGS. 6A, 6B, and 6C are diagrams illustrating the usage of ML models in conveying CSI.

With an AI/ML based air interface, a UE and base station may use train AI/ML models to implement a function. FIG. 6A is a diagram 600 illustrating the usage of ML models in conveying CSI. As shown in FIG. 6A, a UE 602 intends to convey CSI to a base station 604. The UE 602 may use an ML model (e.g., the UE-side CSI compression model 612, which may be a neural network) to derive a compressed representation of the CSI, and feedback the compressed representation to the base station 604. Upon receiving the compressed representation of the CSI, the base station 604 may use another ML model (e.g., the network-side CSI reconstruction model 614, which may be another neural network) to reconstruct the target CSI from the compressed representation.

Figure 6B:
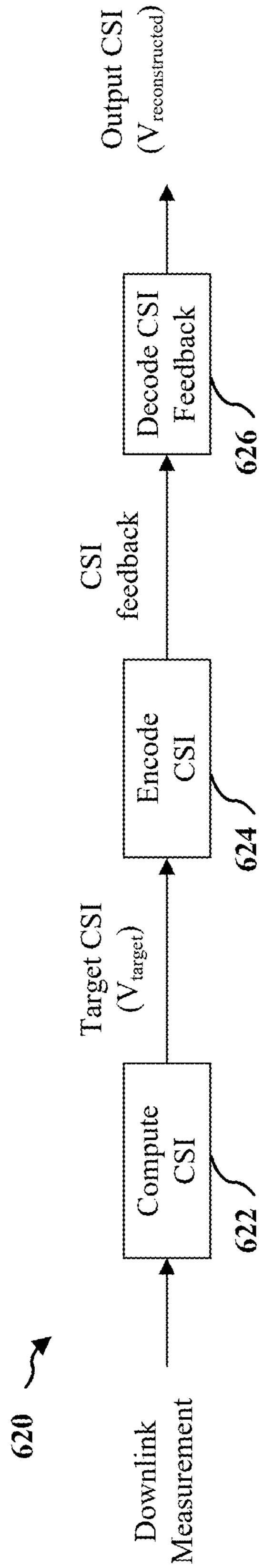

FIG. 6B is a diagram 620 illustrating the usage of ML models in conveying CSI. As shown in FIG. 6B, a UE may compute, at 622, CSI based on downlink measurement. At 624, the UE may encode the computed CSI (i.e., the target CSI $V_{target}$). The encoding of the target CSI may be performed by an ML model, such as the UE-side CSI compression model 612. The UE may send the CSI feedback to the base station. At 626, the base station may decode the encoded CSI received from the UE to obtain the reconstructed CSI (i.e., the Output CSI $V_{reconstructed}$). The decoding may be performed by a network-side ML model, such as the network-side CSI reconstruction model 614.

Figure 6C:
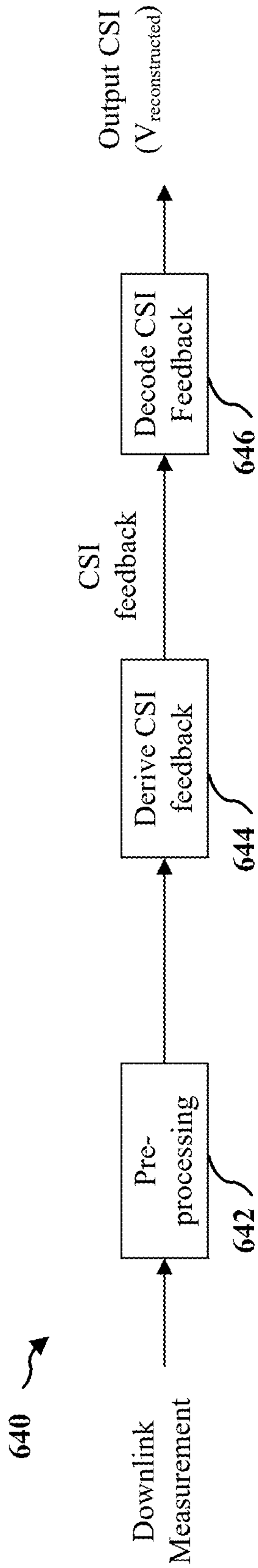

FIG. 6C is a diagram 640 illustrating the usage of ML models in conveying CSI. As shown in FIG. 6C, a UE may, at 644, derive CSI feedback. In one example, the UE may use a UE-side model (e.g., the UE-side CSI compression model 612) to derive CSI feedback directly using the downlink measurement as input, without computing the target CSI. In another example, the UE may use some intermediate quantities (e.g., the channel estimation) as the input to the UE-side model to derive the CSI feedback. The UE may obtain the intermediate quantities through a pre-processing process (at 642) for deriving the CSI feedback. The UE may send the CSI feedback to the base station. At 646, the base station may decode the CSI feedback received from the UE to obtain the reconstructed CSI (i.e., the Output CSI $V_{reconstructed}$). The decoding may be performed by a network-side ML model, such as the network-side CSI reconstruction model 614.

The performance of the ML model may be monitored to detect scenarios where the ML model's performance is inadequate. In the example of FIG. 6A, ML models are used to compress and reconstruct CSI. Hence, the goal of the model monitoring may be to identify cases where the reconstructed CSI is substantially different from the target CSI that the UE intended to convey.

In order to determine whether the reconstructed CSI is close to the target CSI, the base station may first determine or obtain the original CSI, which is available to the UE. However, conveying the "ground truth" target CSI in its original form may incur significant overhead. Alternatively, the base station may convey the reconstructed CSI to the UE, and the UE may compare the reconstructed CSI received from the base station with the original CSI to determine whether they are close to each other. For example, if the CSI is the precoder vector(s), the base station may convey the reconstructed precoder vector(s) to the UE. If the base station transmits the reconstructed CSI, overhead may be increased. An efficient mechanism is provided herein that enables the base station to convey the reconstructed CSI to the UE.

The present disclosure provides methods and apparatus for monitoring the performance of an ML model without significant communication overhead. In the present disclosure, the ML models for compressing and decompressing the CSI are used as example ML models. However, these examples are not intended to be limiting and the methods and apparatus herein disclosed are applicable for monitoring the performance of other ML models.

In one aspect of the present disclosure, in order to convey the reconstructed CSI, e.g., the reconstructed precoder vector(s), from the base station to the UE, the base station may transmit a pilot signal that is precoded using the reconstructed precoder vector(s). In one configuration, the pilot signal may be a CSI-RS dedicated for model monitoring purpose. In another configuration, the pilot signal may be a DM-RS. The base station may reuse the DM-RS associated with data transmission using the reconstructed precoder vector(s).

Additionally, the base station may further transmit the non-precoded pilots (i.e., the pilot signal without precoding using the reconstructed precoder vector(s)) to the UE. The non-precoded pilots may be transmitted from the different antenna ports to enable to UE to estimate the full channel matrix H between the antenna ports of the base station and the antenna ports of the UE. Using the target CSI and the estimated channel matrix H, the UE may determine the target channel estimation (i.e., the target effective channel) as:

$$C_{target} = HV_{target} \quad (1)$$

where $V_{target}$ is the target CSI (e.g., target precoder vector (s)).

Using the precoded pilot signal, the UE may determine the reconstructed channel estimation (i.e., the estimated effective channel) as:

$$C_{reconstructed} = HV_{reconstructed} \quad (2)$$

Where $V_{reconstructed}$ is the reconstructed CSI (e.g., the reconstructed precoder vector(s)). The UE then may monitor the performance of the ML model based on the target CSI and the reconstructed CSI. In one configuration, the UE may monitor the performance of the ML model by comparing signal quality metrics such as received power, spectral efficiency, or the signal-to-noise ratio (SNR) associated with the target precoder vector(s) and the reconstructed precoder vector(s). A large difference between the signal quality metric values may indicate inadequate reconstruction and a model performance failure. Then, the related ML models may be updated or switched based on the model performance result.

Figure 7:
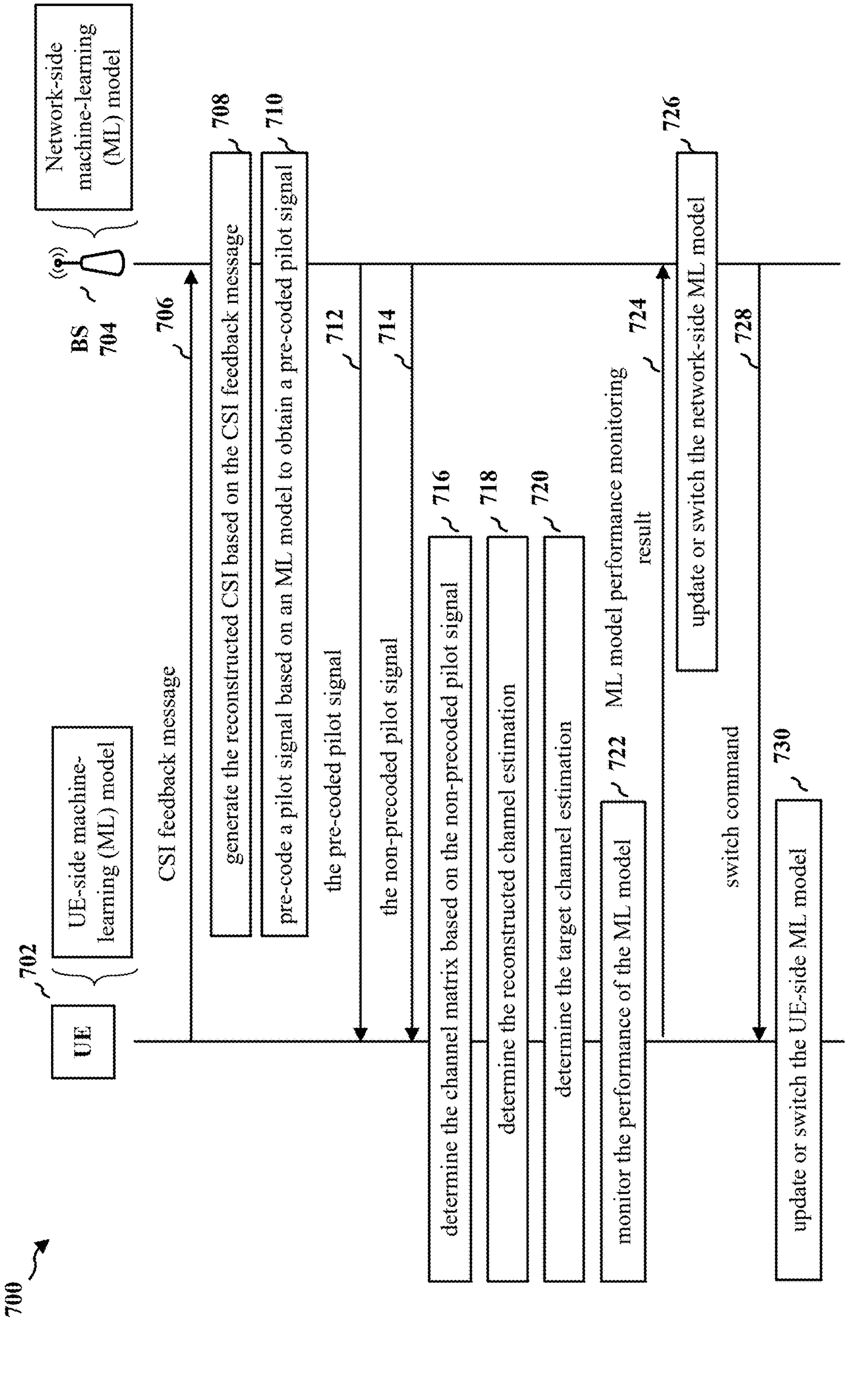
FIG. 7 is a call flow diagram illustrating a method of wireless communication in accordance with various aspects of the present disclosure.

FIG. 7 is a call flow diagram 700 illustrating a method of wireless communication in accordance with various aspects of this present disclosure. Although aspects are described for a base station 704, the aspects may be performed by a base station in aggregation and/or by one or more components of a base station 704 (e.g., such as a CU 110, a DU 130, and/or an RU 140). As illustrated, the base station 704 may be associated with or include a network-side ML model, and the UE 702 may be associated with or include a UE-side ML model.

As shown in FIG. 7, a UE 702 may, at 706, transmit the CSI feedback message to the base station 704. The CSI feedback message may be obtained by compressing a target CSI via the UE-side ML model. For example, referring to FIG. 6A, the UE-side CSI compression model 612 may compress the target CSI to obtain the CSI feedback message (e.g., compressed CSI).

At 708, the base station 704 may generate the reconstructed CSI based on the CSI feedback message. The reconstructed CSI may be generated by the network-side ML model. For example, referring to FIG. 6A, the network-side CSI reconstruction model 614 may generate reconstructed CSI based on the CSI feedback message.

At 710, the base station 704 may pre-code a pilot signal based on an ML model to obtain a pre-coded pilot signal. The ML model may be the network-side ML model. In one example, the pre-coded pilot signal may be generated by precoding a pilot signal with the reconstructed CSI generated by the network-side ML model.

At 712, the base station 704 may transmit the pre-coded pilot signal to the UE 702.

At 714, the base station 704 may further transmit the non-precoded pilot signal to the UE 702. In one configuration, the non-precoded pilot signal may be the pilot signal without precoding with the reconstructed CSI. In one example, the pilot signal may be a CSI-RS dedicated to model monitoring purposes. In another example, the pilot signal may be a DM-RS, which may be the DM-RS associated with data transmission using the reconstructed CSI.

At 716, the UE 702 may determine the channel matrix for the channel between the UE 702 and the base station 704 based on the non-precoded pilot signal.

At 718, the UE 702 may determine the reconstructed channel estimation. For example, the reconstructed channel estimation may be determined using Equation (2) based on the channel matrix, which may be determined by the UE 702 at 716, and the reconstructed CSI, which may be based on the pre-coded pilot signal obtained at 712.

At 720, the UE 702 may determine the target channel estimation. For example, the target channel estimation may be determined using Equation (1) based on the channel matrix, which may be determined by the UE 702 at 716, and the target CSI.

At 722, the UE 702 may monitor the performance of the ML model. In one example, the UE 702 may monitor the performance of the ML model by comparing the reconstructed channel estimation, which was determined at 718, and the target channel estimation, which was determined at 720. The ML model may be the network-side ML model.

At 724, the UE 702 may transmit an ML model performance monitoring result to the base station 704.

At 726, the base station 704 may update or switch the network-side ML model based on the ML model performance monitoring result it receives at 724.

At 730, the UE 702 may update or switch the UE-side ML model. In one example, the decision to update or switch the UE-side ML model may be made by the UE based on the ML model performance monitoring result. In another example, the decision to update or switch the UE-side ML model may be made by the base station 704 based on the ML model performance monitoring result, and the base station 704 may send, at 728, a switch command to the UE 702 for the UE 702 to update or switch the UE-side ML model.

Figure 8:
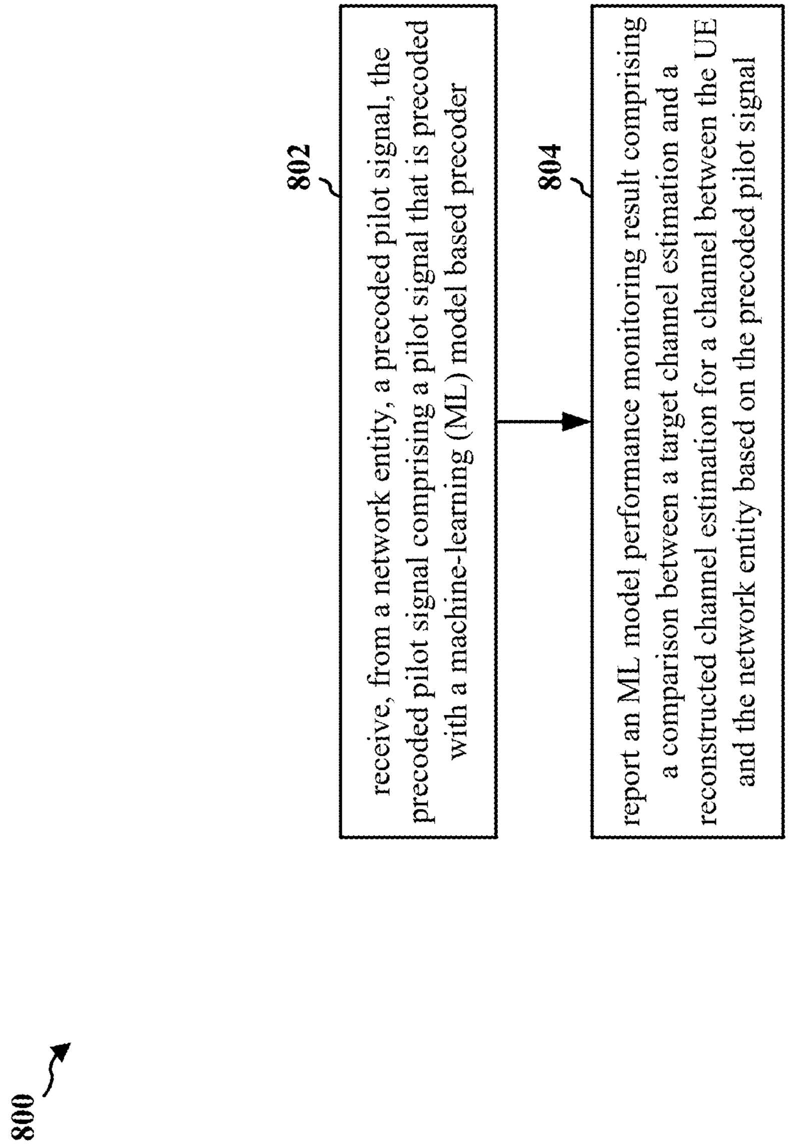
FIG. 8 is the first flowchart illustrating methods of wireless communication at a UE in accordance with various aspects of the present disclosure.

FIG. 8 is a flowchart 800 illustrating methods of wireless communication at a UE in accordance with various aspects of the present disclosure. The method may be performed by a UE. The UE may be the UE 104, 350, 702; first network entity 402; or the apparatus 1204 in the hardware implementation of FIG. 12. The method allows a UE to monitor the performance of an ML model without the overhead of conveying the target CSI to the network entity. Hence, it improves the efficiency and reliability of wireless communication.

As shown in FIG. 8, at 802, the UE may receive a precoded pilot signal from a network entity. The precoded pilot signal may include a pilot signal that is precoded with an ML model based precoder. The network entity may be a base station, or a component of a base station, in the access network of FIG. 1 or a core network component (e.g., base station 102, 310, 704; or the network entity 404 or 1202 in the hardware implementation of FIG. 12). FIGS. 6A, 6B, 6C, and 7 illustrate various aspects of the steps in connection with flowchart 800. For example, referring to FIG. 7, the UE 702 may receive, at 712, a precoded pilot signal from a network entity (base station 704). The precoded pilot signal may include a pilot signal that is precoded with an ML model (e.g., the network-side ML model) based precoder.

At 804, the UE may report an ML model performance monitoring result. The ML model performance monitoring result may include a comparison between a target channel estimation and a reconstructed channel estimation for a channel between the UE and the network entity based on the precoded pilot signal. For example, referring to FIG. 7, the UE 702 may report, at 724, an ML model performance monitoring result to the network entity (base station 704). The ML model performance monitoring result may include a comparison between a target channel estimation (which is determined at 720) and a reconstructed channel estimation (which is determined at 718) for a channel between the UE 702 and the network entity (base station 704) based on the precoded pilot signal.

Figure 9:
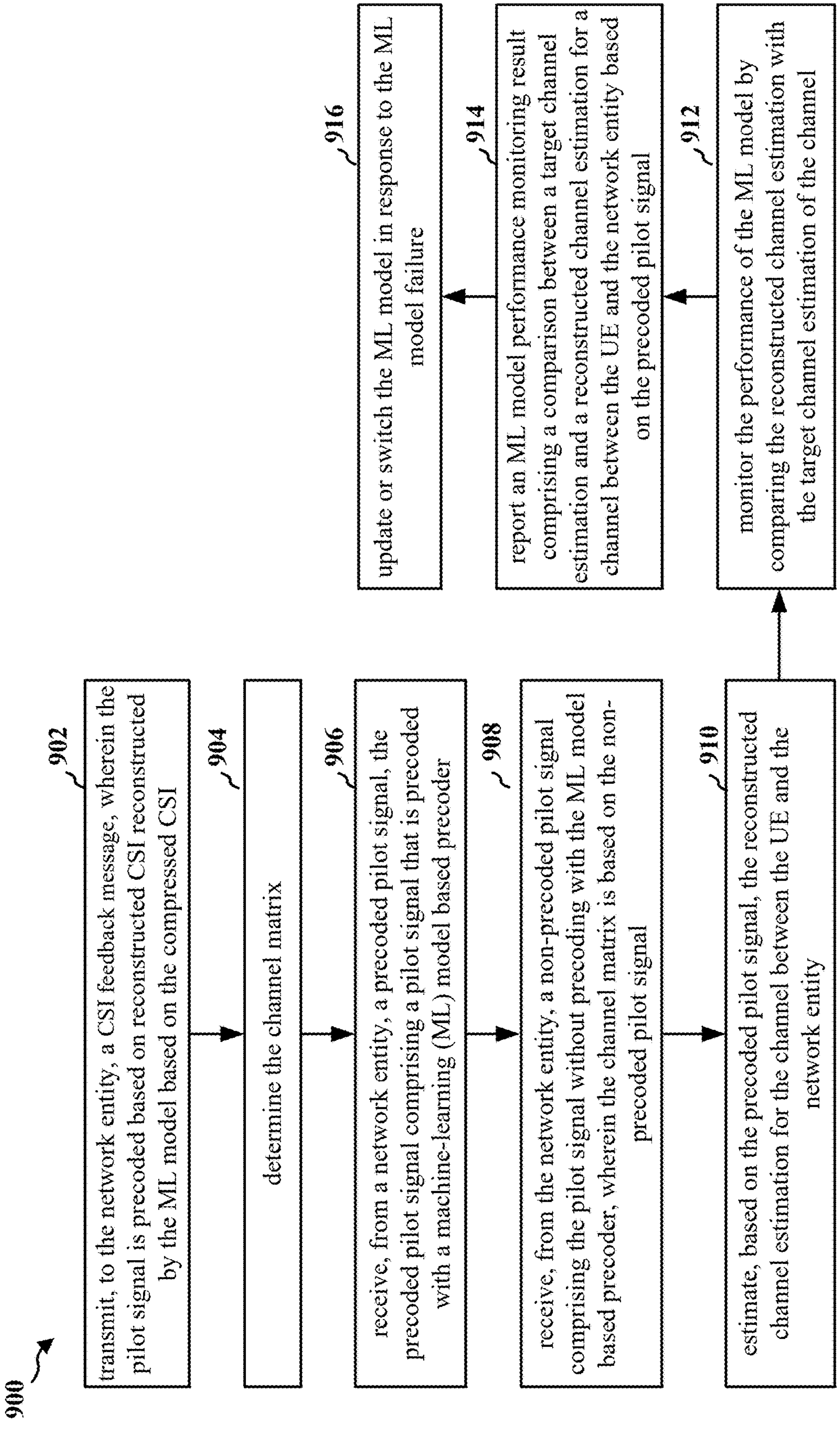
FIG. 9 is the second flowchart illustrating methods of wireless communication at a UE in accordance with various aspects of the present disclosure.

FIG. 9 is a flowchart 900 illustrating methods of wireless communication at a UE in accordance with various aspects of the present disclosure. The method may be performed by a UE. The UE may be the UE 104, 350, 702; first network entity 402; or the apparatus 1204 in the hardware implementation of FIG. 12. The method allows a UE to monitor the performance of an ML model without the overhead of conveying the target CSI to the network entity. Hence, it improves the efficiency and reliability of wireless communication.

As shown in FIG. 9, at 906, the UE may receive a precoded pilot signal from a network entity. The precoded pilot signal may include a pilot signal that is precoded with an ML model based precoder. The network entity may be a base station, or a component of a base station, in the access network of FIG. 1 or a core network component (e.g., base station 102, 310, 704; or the network entity 404 or 1202 in the hardware implementation of FIG. 12). FIGS. 6A, 6B, 6C, and 7 illustrate various aspects of the steps in connection with flowchart 900. For example, referring to FIG. 7, the UE 702 may receive, at 712, a precoded pilot signal from a network entity (base station 704). The precoded pilot signal may include a pilot signal that is precoded with an ML model (e.g., the network-side ML model) based precoder.

At 914, the UE may report an ML model performance monitoring result. The ML model performance monitoring result may include a comparison between a target channel estimation and a reconstructed channel estimation for a channel between the UE and the network entity based on the precoded pilot signal. For example, referring to FIG. 7, the UE 702 may report, at 724, an ML model performance monitoring result to the network entity (base station 704). The ML model performance monitoring result may include a comparison between a target channel estimation (which is determined at 720) and a reconstructed channel estimation (which is determined at 718) for a channel between the UE 702 and the network entity (base station 704) based on the precoded pilot signal.

In some aspects, the ML model based precoder may be based on reconstructed CSI for the channel between the UE and the network entity. For example, referring to FIG. 7, the ML model based precoder may be based on reconstructed CSI (at 708) for the channel between the UE 702 and the network entity (base station 704).

In some aspects, the pilot signal may include one of a CSI-RS or a DM-RS. For example, referring to FIG. 7, when the base station 704 pre-codes, at 710, a pilot signal to obtain a pre-coded pilot signal, the pilot signal may be a CSI-RS or a DM-RS.

In some aspects, the reconstructed channel estimation may be based on the channel matrix and the reconstructed CSI, and the target channel estimation may be based on the channel matrix and a target CSI. For example, referring to Equations (1) and (2), the reconstructed channel estimation ($C_{reconstructed}$) may be determined by Equation (2) based on the channel matrix (H) and the reconstructed CSI ($V_{reconstructed}$), and the target channel estimation ($C_{target}$) may be determined by Equation (1) based on the channel matrix (H) and a target CSI ($V_{target}$).

At 908, the UE may receive a non-precoded pilot signal from the network entity. The non-precoded pilot signal may include the pilot signal without precoding with the ML model based precoder. The channel matrix may be based on the non-precoded pilot signal. For example, referring to FIG. 7, the UE 702 may receive, at 714, a non-precoded pilot signal from the network entity (base station 704). The non-precoded pilot signal may include the pilot signal without precoding with the ML model based precoder (e.g., the reconstructed CSI). The channel matrix may be determined, at 716, based on the non-precoded pilot signal.

At 904, the UE may determine the channel matrix prior to receiving the precoded pilot signal. For example, the channel matrix may be determined by the UE based on information obtained from a prior data or control transmission with the base station or based on a prior indication from the base station. Hence, the UE may determine the channel matrix prior to receiving the precoded pilot signal.

At 910, the UE may estimate, based on the precoded pilot signal, the reconstructed channel estimation for the channel between the UE and the network entity. At 912, the UE may monitor the performance of the ML model by comparing the reconstructed channel estimation with the target channel estimation of the channel. For example, referring to FIG. 7, the UE 702 may estimate, at 718, based on the precoded pilot signal, the reconstructed channel estimation for the channel between the UE 702 and the network entity (base station 704).

In some aspects, to monitor the performance of the ML model, the UE may compute a first signal quality metric associated with a reconstructed CSI; and compute a second signal quality metric associated with a target CSI. The comparison reported to the network entity may include the comparison of the first signal quality metric and the second signal quality metric. For example, referring to FIG. 7, the UE 702 may compute a first signal quality metric associated with a reconstructed CSI, and compute a second signal quality metric associated with a target CSI. The comparison reported to the network entity (base station 704), at 724, may include the comparison of the first signal quality metric and the second signal quality metric. In some examples, the first signal quality metric may be a first SNR associated with a reconstructed CSI, and the second signal quality metric may be a second SNR associated with the target CSI.

In some aspects, the ML model performance monitoring result may indicate an ML model failure based on a difference between the first signal quality metric and the second signal quality metric being greater than a quality threshold. For example, referring to FIG. 7, when the UE 702 reports, at 724, the ML model performance monitoring result to the base station 704. The ML model performance monitoring result may indicate an ML model failure (e.g., the network-side ML model failure) based on a difference between the first signal quality metric (e.g., the first SNR) and the second signal quality metric (e.g., the second SNR) being greater than a quality threshold. The quality threshold may be determined based on one or more parameters associated with the ML model and is not limited in this disclosure.

At 916, the ML model may be updated or switched in response to the ML model failure. For example, referring to FIG. 7, the network-side ML model (at 726), the UE-side ML model (at 730), or both may be updated or switched in response to the ML model failure.

At 902, the UE may transmit a CSI feedback message to the network entity. The pilot signal may be precoded based on reconstructed CSI reconstructed by the ML model based on the CSI feedback message. For example, referring to FIG. 7, the UE 702 may transmit, at 706, a CSI feedback message to the network entity (base station 704). The pilot signal may be precoded, at 7710, based on reconstructed CSI reconstructed by the ML model (e.g., the network-side ML model) based on the CSI feedback message.

In some aspects, the ML model may include one or more layers of neural networks. For example, referring to FIG. 7, the ML model (e.g., the network-side ML model) may include one or more layers of neural networks.

Figure 10:
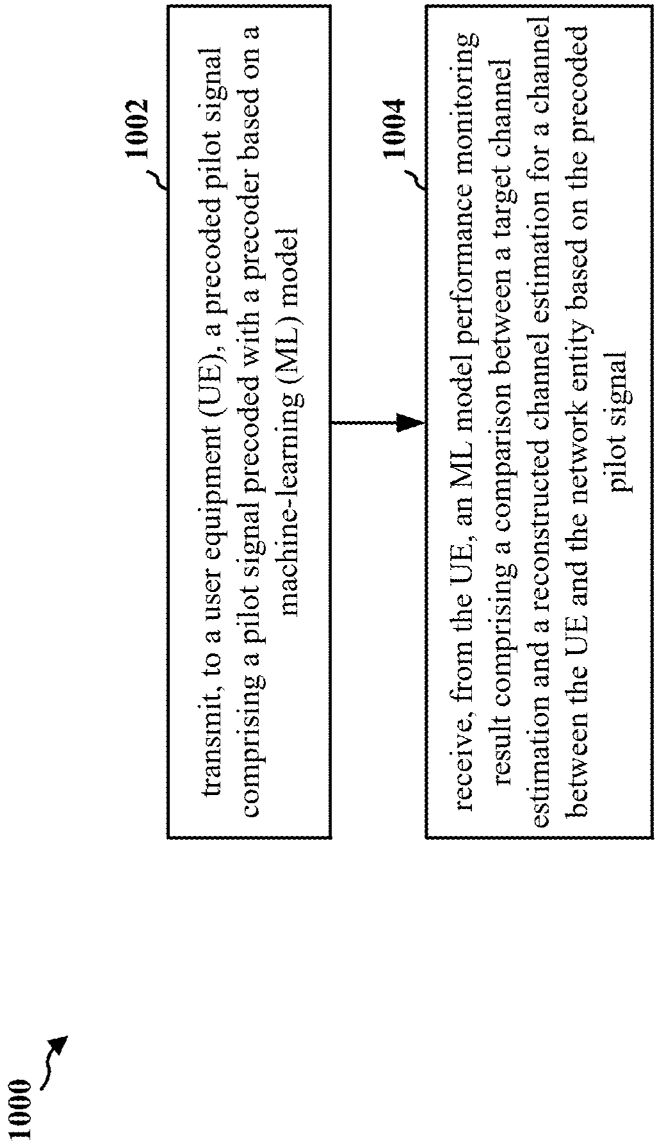
FIG. 10 is the first flowchart illustrating methods of wireless communication at a network entity in accordance with various aspects of the present disclosure.

FIG. 10 is a flowchart 1000 illustrating methods of wireless communication at a network entity in accordance with various aspects of the present disclosure. The method may be performed by a network entity. The network entity may be a base station, or a component of a base station, in the access network of FIG. 1 or a core network component (e.g., base station 102, 310, 704; or the network entity 404 or 1202 in the hardware implementation of FIG. 12). The method allows a UE to monitor the performance of an ML model without the overhead of conveying the target CSI to the network entity. Hence, it improves the efficiency and reliability of wireless communication.

As shown in FIG. 10, at 1002, the network entity may transmit a precoded pilot signal to a UE. The precoded pilot signal may include a pilot signal precoded with a precoder based on an ML model. The UE may be the UE 104, 350, 702; first network entity 402; or the apparatus 1204 in the hardware implementation of FIG. 12. FIGS. 6A, 6B, 6C, and 7 illustrate various aspects of the steps in connection with flowchart 1000. For example, referring to FIG. 7, the network entity (base station 704) may transmit, at 712, a precoded pilot signal to a UE 702. The precoded pilot signal may include a pilot signal that is precoded with an ML model (e.g., the network-side ML model) based precoder.

At 1004, the network entity may receive an ML model performance monitoring result from the UE. The ML model performance monitoring result may include a comparison between a target channel estimation and a reconstructed channel estimation for a channel between the UE and the network entity based on the precoded pilot signal. For example, referring to FIG. 7, the network entity (base station 704) may receive, at 724, an ML model performance monitoring result from the UE 702. The ML model performance monitoring result may include a comparison between a target channel estimation (which is determined at 720) and a reconstructed channel estimation (which is determined at 718) for a channel between the UE 702 and the network entity (base station 704) based on the precoded pilot signal.

Figure 11:
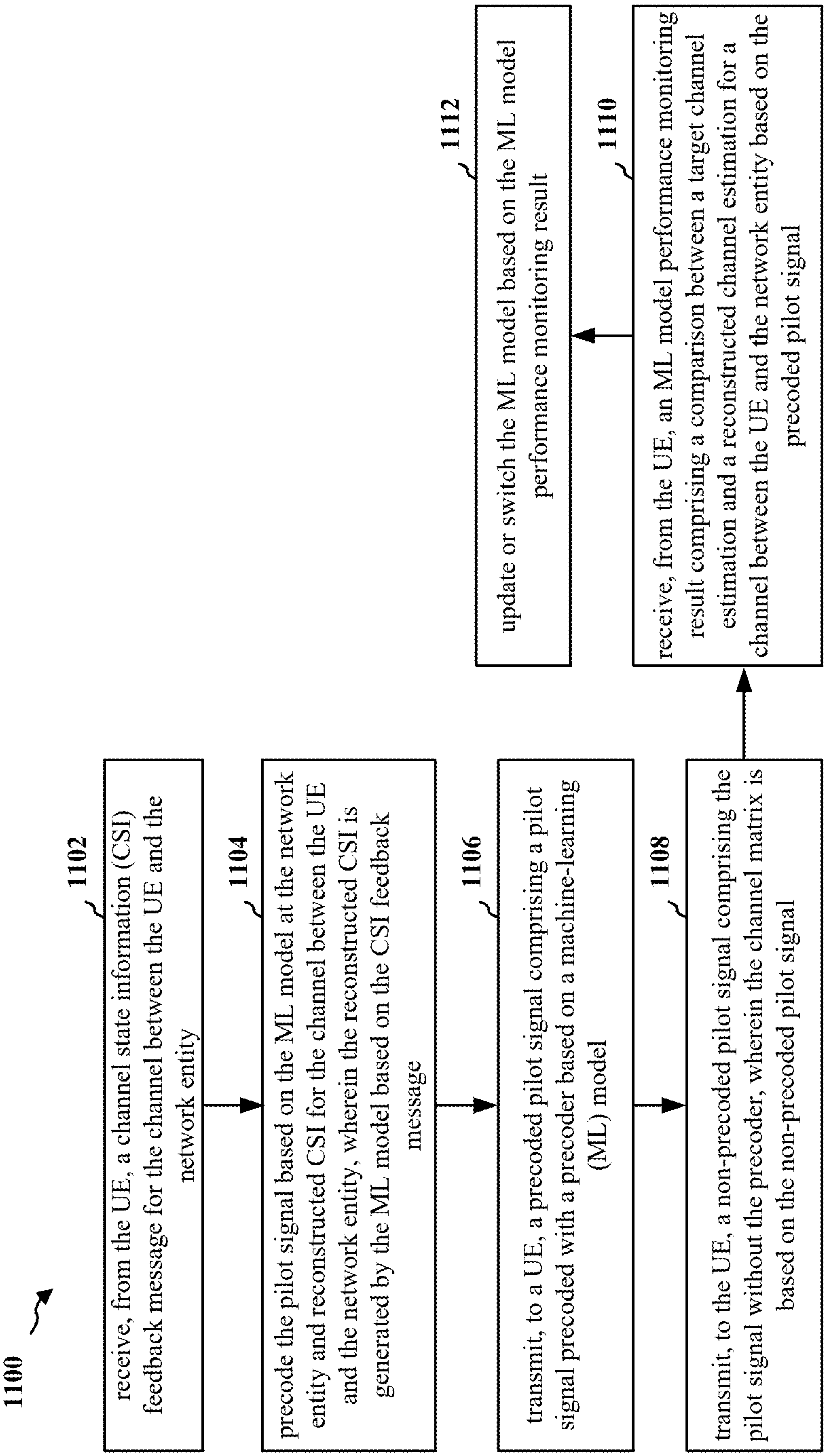
FIG. 11 is the second flowchart illustrating methods of wireless communication at a network entity in accordance with various aspects of the present disclosure.

FIG. 11 is a flowchart 1100 illustrating methods of wireless communication at a network entity in accordance with various aspects of the present disclosure. The method may be performed by a network entity. The network entity may be a base station, or a component of a base station, in the access network of FIG. 1 or a core network component (e.g., base station 102, 310, 704; or the network entity 404 or 1202 in the hardware implementation of FIG. 12). The method allows a UE to monitor the performance of an ML model without the overhead of conveying the target CSI to the network entity. Hence, it improves the efficiency and reliability of wireless communication.

As shown in FIG. 11, at 1106, the network entity may transmit a precoded pilot signal to a UE. The precoded pilot signal may include a pilot signal precoded with a precoder based on an ML model. The UE may be the UE 104, 350, 702; first network entity 402; or the apparatus 1204 in the hardware implementation of FIG. 12. FIGS. 6A, 6B, 6C, and 7 illustrate various aspects of the steps in connection with flowchart 1100. For example, referring to FIG. 7, the network entity (base station 704) may transmit, at 712, a precoded pilot signal to a UE 702. The precoded pilot signal may include a pilot signal that is precoded with an ML model (e.g., the network-side ML model) based precoder.

At 1110, the network entity may receive an ML model performance monitoring result from the UE. The ML model performance monitoring result may include a comparison between a target channel estimation and a reconstructed channel estimation for a channel between the UE and the network entity based on the precoded pilot signal. For example, referring to FIG. 7, the network entity (base station 704) may receive, at 724, an ML model performance monitoring result from the UE 702. The ML model performance monitoring result may include a comparison between a target channel estimation (which is determined at 720) and a reconstructed channel estimation (which is determined at 718) for a channel between the UE 702 and the network entity (base station 704) based on the precoded pilot signal.

At 1102, the network entity may receive, from the UE, a CSI feedback message for the channel between the UE and the network entity. At 1104, the network entity may precode the pilot signal based on the ML model at the network entity and reconstructed CSI for the channel between the UE and the network entity. The reconstructed CSI may be generated by the ML model based on the CSI feedback message. For example, referring to FIG. 7, the network entity (base station 704) may receive, at 706, from the UE 702, a CSI feedback message for the channel between the UE 702 and the network entity (base station 704). The network entity (base station 704) may precode, at 710, the pilot signal based on the ML model (e.g., the network-side ML model) at the network entity (base station 704) and reconstructed CSI for the channel between the UE 702 and the network entity (base station 704). The reconstructed CSI may be generated by the ML model (e.g., the network-side ML model) based on the CSI feedback message.

In some aspects, the pilot signal may include one of a CSI-RS or a DM-RS. For example, referring to FIG. 7, when the base station 704 pre-codes, at 710, a pilot signal to obtain a pre-coded pilot signal, the pilot signal may be a CSI-RS or a DM-RS.

In some aspects, the reconstructed channel estimation may be based on the channel matrix and the reconstruction of the CSI feedback message, and the target channel estimation may be based on the channel matrix and a target CSI. For example, referring to Equations (1) and (2), the reconstructed channel estimation ($C_{reconstructed}$) may be determined by Equation (2) based on the channel matrix (H) and the reconstruction of the CSI feedback message (i.e., the reconstructed CSI $V_{reconstructed}$), and the target channel estimation ($C_{target}$) may be determined by Equation (1) based on the channel matrix (H) and a target CSI ($V_{target}$).

At 1108, the network entity may transmit a non-precoded pilot signal to the UE. The non-precoded pilot signal may include the pilot signal without the precoder. The channel matrix may be based on the non-precoded pilot signal. For example, referring to FIG. 7, the network entity (base station 704) may transmit, at 714, a non-precoded pilot signal to the UE 702. The non-precoded pilot signal may include the pilot signal without precoding with the ML model based precoder (e.g., the reconstructed CSI). The channel matrix may be determined, at 716, based on the non-precoded pilot signal.

In some aspects, the channel matrix may be determined prior to transmitting the precoded pilot signal. For example, the channel matrix may be determined by the UE based on information obtained from a prior data or control transmission with the base station or based on a prior indication from the base station. Hence, the channel matrix may be determined prior to transmitting the precoded pilot signal.

In some aspects, the ML model performance monitoring result may include a comparison between a first signal quality metric associated with the reconstructed CSI and a second signal quality metric associated with the target CSI. For example, referring to FIG. 7, the UE 702 may compute a first signal quality metric associated with a reconstructed CSI, and compute a second signal quality metric associated with a target CSI. The ML model performance monitoring result (at 724) may include the comparison of the first signal quality metric and the second signal quality metric. In some examples, the first signal quality metric may be the first SNR associated with the reconstructed CSI and the second signal quality metric may be the second SNR associated with the target CSI.

In some aspects, the ML model performance monitoring result may indicate an ML model failure based on a difference between the first signal quality metric and the second signal quality metric being greater than a quality threshold. For example, referring to FIG. 7, when the network entity (base station 704) receives, at 724, the ML model performance monitoring result from the UE 702. The ML model performance monitoring result may indicate an ML model failure (e.g., the network-side ML model failure) based on a difference between the first signal quality metric and the second signal quality metric being greater than a quality threshold. The quality threshold may be indicated to the UE or determined by the UE or provided by or associated with the ML model.

At 1112, the network entity may update or switch the ML model based on the ML model performance monitoring result. For example, referring to FIG. 7, the network entity (base station 704) may update or switch the ML model (e.g., the network-side ML model) based on the ML model performance monitoring result it receives at 724. In some examples, the network entity (base station 704) may send, at 728, a switch command to the UE 702 for the UE 702 to, at 730, update or switch the UE-side ML model. In some examples, both the UE-side ML model and the network-side ML model may be updated or switched.

In some aspects, to update or switch the ML model, the network entity may, in response to the ML model performance monitoring result indicating the ML model failure, deactivate the ML model or replace the ML model with a substitute ML model. For example, referring to FIG. 7, to update or switch the ML model (e.g., the network-side ML model), the network entity (base station 704) may, in response to the ML model performance monitoring result indicating the ML model failure, deactivate the ML model or replace the ML model with a substitute ML model.

In some aspects, the ML model may include one or more layers of neural networks. For example, referring to FIG. 7, the ML model (e.g., the network-side ML model) may include one or more layers of neural networks.

Figure 12:
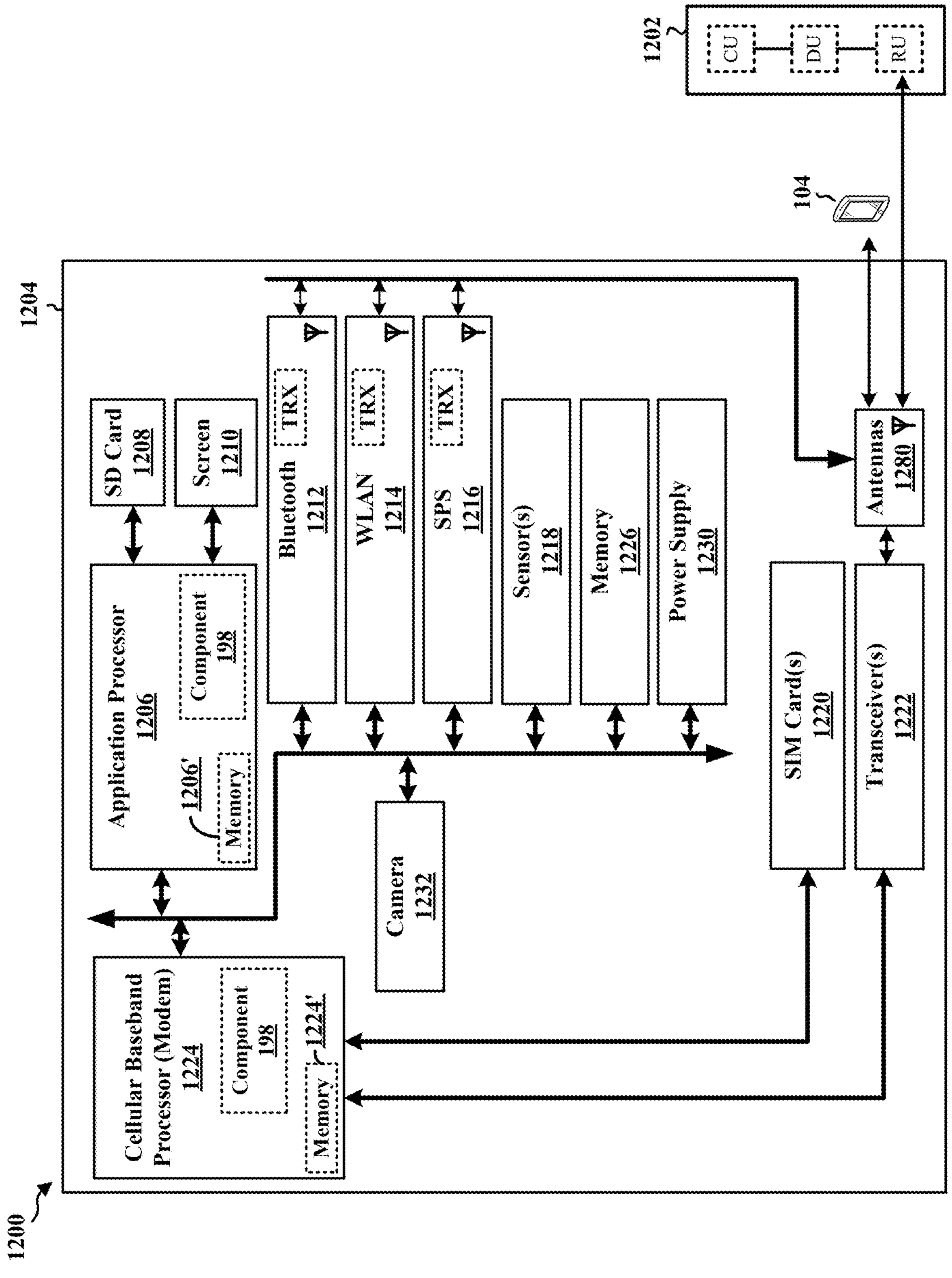
FIG. 12 is a diagram illustrating an example of a hardware implementation for an example apparatus and/or network entity.

FIG. 12 is a diagram 1200 illustrating an example of a hardware implementation for an apparatus 1204. The apparatus 1204 may be a UE, a component of a UE, or may implement UE functionality. In some aspects, the apparatus 1204 may include a cellular baseband processor 1224 (also referred to as a modem) coupled to one or more transceivers 1222 (e.g., cellular RF transceiver). The cellular baseband processor 1224 may include on-chip memory 1224'. In some aspects, the apparatus 1204 may further include one or more subscriber identity modules (SIM) cards 1220 and an application processor 1206 coupled to a secure digital (SD) card 1208 and a screen 1210. The application processor 1206 may include on-chip memory 1206'. In some aspects, the apparatus 1204 may further include a Bluetooth module 1212, a WLAN module 1214, an SPS module 1216 (e.g., GNSS module), one or more sensor modules 1218 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1226, a power supply 1230, and/or a camera 1232. The Bluetooth module 1212, the WLAN module 1214, and the SPS module 1216 may include an on-chip transceiver (TRX) (or in some cases, just a receiver (RX)). The Bluetooth module 1212, the WLAN module 1214, and the SPS module 1216 may include their own dedicated antennas and/or utilize the antennas 1280 for communication. The cellular baseband processor 1224 communicates through the transceiver(s) 1222 via one or more antennas 1280 with the UE 104 and/or with an RU associated with a network entity 1202. The cellular baseband processor 1224 and the application processor 1206 may each include a computer-readable medium/memory 1224', 1206', respectively. The additional memory modules 1226 may also be considered a computer-readable medium/memory. Each computer-readable medium/memory 1224', 1206', 1226 may be non-transitory. The cellular baseband processor 1224 and the application processor 1206 are each responsible for general processing, including the execution of software stored on the computer-readable medium/memory. The software, when executed by the cellular baseband processor 1224/application processor 1206, causes the cellular baseband processor 1224/application processor 1206 to perform the various functions described supra. The computer-readable medium/memory may also be used for storing data that is manipulated by the cellular baseband processor 1224/application processor 1206 when executing software. The cellular baseband processor 1224/application processor 1206 may be a component of the UE 350 and may include the memory 360 and/or at least one of the TX processor 368, the RX processor 356, and the controller/processor 359. In one configuration, the apparatus 1204 may be a processor chip (modem and/or application) and include just the cellular baseband processor 1224 and/or the application processor 1206, and in another configuration, the apparatus 1204 may be the entire UE (e.g., see 350 of FIG. 3) and include the additional modules of the apparatus 1204.

As discussed supra, the component 198 is configured to receive, from a network entity, a precoded pilot signal, the precoded pilot signal comprising a pilot signal that is precoded with an ML model based precoder; and report an ML model performance monitoring result comprising a comparison between a target channel estimation and a reconstructed channel estimation for a channel between the UE and the network entity based on the precoded pilot signal. The component 198 may be further configured to perform any of the aspects described in connection with the flowcharts in FIG. 8 and FIG. 9, and/or performed by the UE 702 in FIG. 7. The component 198 may be within the cellular baseband processor 1224, the application processor 1206, or both the cellular baseband processor 1224 and the application processor 1206. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1204 may include a variety of components configured for various functions. In one configuration, the apparatus 1204, and in particular the cellular baseband processor 1224 and/or the application processor 1206, includes means for receiving, from a network entity, a precoded pilot signal, the precoded pilot signal comprising a pilot signal that is precoded with an ML model based precoder, and means for reporting an ML model performance monitoring result comprising a comparison between a target channel estimation and a reconstructed channel estimation for a channel between the UE and the network entity based on the precoded pilot signal. The apparatus 1204 may further include means for performing any of the aspects described in connection with the flowcharts in FIG. 8 and FIG. 9, and/or aspects performed by the UE 702 in FIG. 7. The means may be the component 198 of the apparatus 1204 configured to perform the functions recited by the means. As described supra, the apparatus 1204 may include the TX processor 368, the RX processor 356, and the controller/processor 359. As such, in one configuration, the means may be the TX processor 368, the RX processor 356, and/or the controller/processor 359 configured to perform the functions recited by the means.

Figure 13:
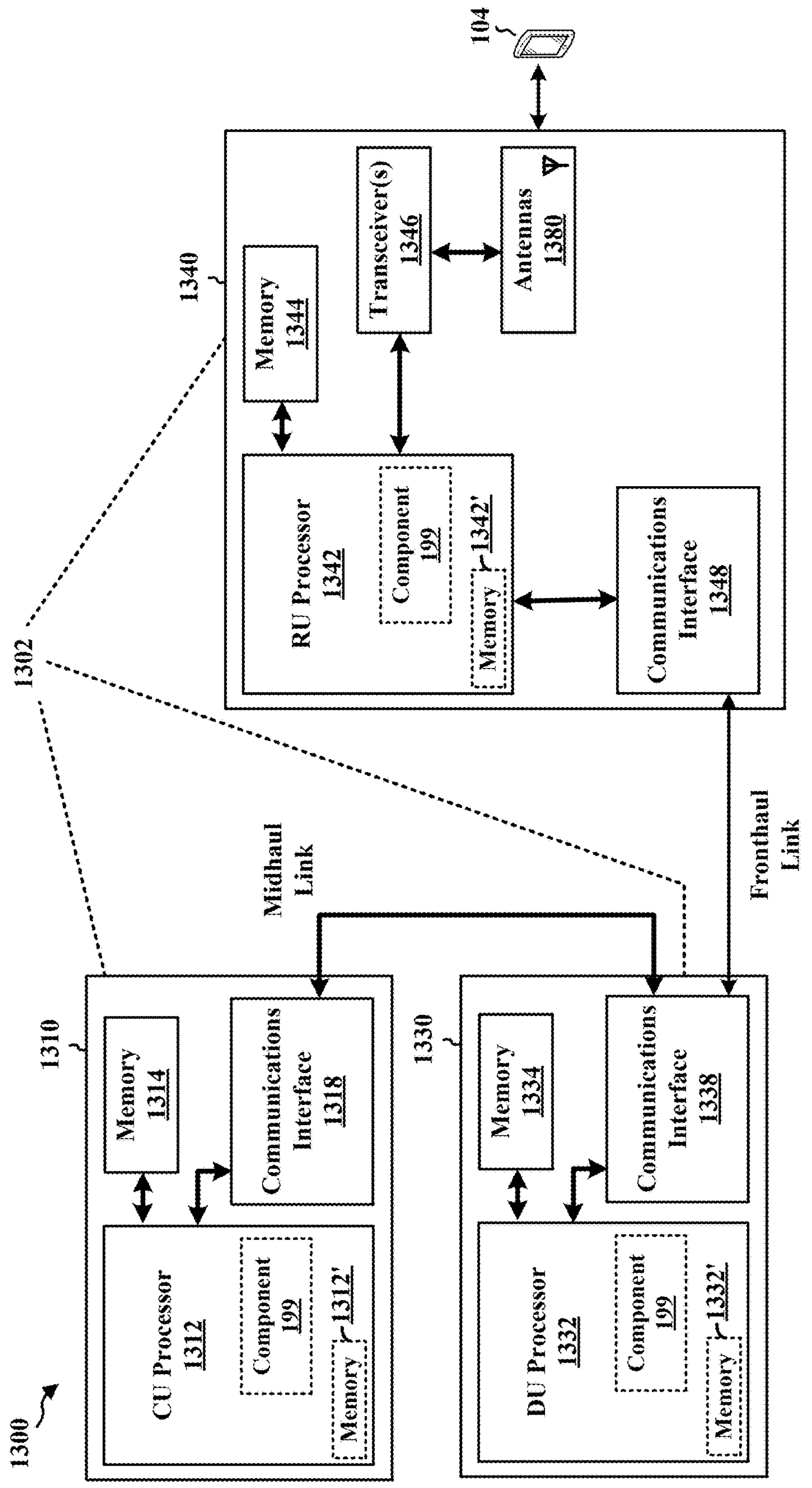
FIG. 13 is a diagram illustrating an example of a hardware implementation for an example network entity.

FIG. 13 is a diagram 1300 illustrating an example of a hardware implementation for a network entity 1302. The network entity 1302 may be a BS, a component of a BS, or may implement BS functionality. The network entity 1302 may include at least one of a CU 1310, a DU 1330, or an RU 1340. For example, depending on the layer functionality handled by the component 199, the network entity 1302 may include the CU 1310; both the CU 1310 and the DU 1330; each of the CU 1310, the DU 1330, and the RU 1340; the DU 1330; both the DU 1330 and the RU 1340; or the RU 1340. The CU 1310 may include a CU processor 1312. The CU processor 1312 may include on-chip memory 1312'. In some aspects, the CU 1310 may further include additional memory modules 1314 and a communications interface 1318. The CU 1310 communicates with the DU 1330 through a midhaul link, such as an F1 interface. The DU 1330 may include a DU processor 1332. The DU processor 1332 may include on-chip memory 1332'. In some aspects, the DU 1330 may further include additional memory modules 1334 and a communications interface 1338. The DU 1330 communicates with the RU 1340 through a fronthaul link. The RU 1340 may include an RU processor 1342. The RU processor 1342 may include on-chip memory 1342'. In some aspects, the RU 1340 may further include additional memory modules 1344, one or more transceivers 1346, antennas 1380, and a communications interface 1348. The RU 1340 communicates with the UE 104. The on-chip memory 1312', 1332', 1342' and the additional memory modules 1314, 1334, 1344 may each be considered a computer-readable medium/memory. Each computer-readable medium/memory may be non-transitory. Each of the processors 1312, 1332, 1342 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to transmit, to a UE, a precoded pilot signal comprising a pilot signal precoded with a precoder based on an ML model; and receive, from the UE, an ML model performance monitoring result comprising a comparison between a target channel estimation and a reconstructed channel estimation for a channel between the UE and the network entity based on the precoded pilot signal. The component 199 may be further configured to perform any of the aspects described in connection with the flowcharts in FIG. 10 and FIG. 11, and/or performed by the base station 704 in FIG. 7. The component 199 may be within one or more processors of one or more of the CU 1310, DU 1330, and the RU 1340. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1302 may include a variety of components configured for various functions. In one configuration, the network entity 1302 includes means for transmitting, to a UE, a precoded pilot signal comprising a pilot signal precoded with a precoder based on an ML model, and means for receiving, from the UE, an ML model performance monitoring result comprising a comparison between a target channel estimation and a reconstructed channel estimation for a channel between the UE and the network entity based on the precoded pilot signal. The network entity 1302 may further include means for performing any of the aspects described in connection with the flowcharts in FIG. 10 and FIG. 11, and/or aspects performed by the base station 704 in FIG. 7. The means may be the component 199 of the network entity 1302 configured to perform the functions recited by the means. As described supra, the network entity 1302 may include the TX processor 316, the RX processor 370, and the controller/processor 375. As such, in one configuration, the means may be the TX processor 316, the RX processor 370, and/or the controller/processor 375 configured to perform the functions recited by the means.

This disclosure provides a method for wireless communication at a UE. The method may include receiving, from a network entity, a precoded pilot signal, the precoded pilot signal comprising a pilot signal that is precoded with an ML model based precoder; and reporting an ML model performance monitoring result comprising a comparison between a target channel estimation and a reconstructed channel estimation for a channel between the UE and the network entity based on the precoded pilot signal. The method allows the UE to monitor the performance of an ML model without the overhead of conveying the target CSI to the network entity. Hence, it improves the efficiency and reliability of wireless communication.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE. The method may include receiving a precoded pilot signal from a network entity. The precoded pilot signal may include a pilot signal that is precoded with a machine-learning (ML) model based precoder. The method may further include reporting an ML model performance monitoring result including a comparison between a target channel estimation and a reconstructed channel estimation for a channel between the UE and the network entity based on the precoded pilot signal.

Aspect 2 is the method of aspect 1, where the ML model based precoder is based on reconstructed CSI for the channel between the UE and the network entity.

Aspect 3 is the method of any of aspects 1 to 2, where the pilot signal may include one of a CSI-RS or a DM-RS.

Aspect 4 is the method of any of aspects 2 to 3, where the reconstructed channel estimation may be based on the channel matrix and the reconstructed CSI, and the target channel estimation may be based on the channel matrix and the target CSI.

Aspect 5 is the method of any of aspects 1 to 4, where the method may further include: receiving a non-precoded pilot signal from the network entity. The non-precoded pilot signal may include the pilot signal without precoding with the ML model based precoder, and the channel matrix may be based on the non-precoded pilot signal.

Aspect 6 is the method of any of aspects 1 to 4, where the method may further include: determining the channel matrix prior to receiving the precoded pilot signal.

Aspect 7 is the method of any of aspects 1 to 6, where the method may further include: estimating, based on the precoded pilot signal, the reconstructed channel estimation for the channel between the UE and the network entity; and monitoring the performance of the ML model by comparing the reconstructed channel estimation with the target channel estimation of the channel.

Aspect 8 is the method of aspect 7, where monitoring the performance of the ML model may include: computing a first signal quality metric associated with a reconstructed CSI; and compute a second signal quality metric associated with a target CSI. The comparison reported to the network entity may include the comparison of the first signal quality metric and the second signal quality metric.

Aspect 9 is the method of aspect 8, where the ML model performance monitoring result may indicate an ML model failure based on a difference between the first signal quality metric and the second signal quality metric being greater than a quality threshold.

Aspect 10 is the method of aspect 9, where the method may further include: updating or switching the ML model in response to the ML model failure.

Aspect 11 is the method of any of aspects 1 to 10, where the method may further include: transmitting a CSI feedback message to the network entity. The pilot signal may be precoded based on reconstructed CSI reconstructed by the ML model based on the CSI feedback message.

Aspect 12 is the method of any of aspects 1 to 11, where the ML model may include one or more layers of neural networks.

Aspect 13 is an apparatus for wireless communication at a UE, including: a memory; and at least one processor coupled to the memory and, based at least in part on information stored in the memory, the at least one processor is configured to perform the method of any of aspects 1-12.

Aspect 14 is the apparatus of aspect 13, further including at least one of a transceiver or an antenna coupled to the at least one processor and configured to receive the precoded pilot signal.

Aspect 15 is an apparatus for wireless communication including means for implementing the method of any of aspects 1-12.

Aspect 16 is a computer-readable medium (e.g., a non-transitory computer-readable medium) storing computer executable code, where the code when executed by a processor causes the processor to implement the method of any of aspects 1-12.

Aspect 17 is a method of wireless communication at a network entity. The method may include transmitting a precoded pilot signal to a UE. The precoded pilot signal may include a pilot signal precoded with a precoder based on an ML model. The method may further include receiving an ML model performance monitoring result from the UE. The ML model performance monitoring result may include a comparison between the target channel estimation and the reconstructed channel estimation for a channel between the UE and the network entity based on the precoded pilot signal.

Aspect 18 is the method of aspect 17, where the method may further include: receiving a CSI feedback message for the channel between the UE and the network entity from the UE; and precoding the pilot signal based on the ML model at the network entity and reconstructed CSI for the channel between the UE and the network entity. The reconstructed CSI may be generated by the ML model based on the CSI feedback message.

Aspect 19 is the method of any of aspects 17 to 18, where the pilot signal may include one of a CSI-RS; or a DM-RS.

Aspect 20 is the method of any of aspects 18 and 19, where the reconstructed channel estimation may be based on the channel matrix and a reconstruction of the CSI feedback message, and the target channel estimation may be based on the channel matrix and the target CSI.

Aspect 21 is the method of any of aspects 17 to 20, where the method may further include: transmitting a non-precoded pilot signal to the UE. The non-precoded pilot signal may include the pilot signal without the precoder. The channel matrix may be based on the non-precoded pilot signal.

Aspect 22 is the method of any of aspects 17 to 20, where the channel matrix may be determined prior to transmitting the precoded pilot signal.

Aspect 23 is the method of any of aspects 17 to 20, where the ML model performance monitoring result may include a comparison between a first signal quality metric associated with the reconstructed CSI and a second signal quality metric associated with the target CSI.

Aspect 24 is the method of aspect 23, where the ML model performance monitoring result may indicate an ML model failure based on a difference between the first signal quality metric and the second signal quality metric being greater than a quality threshold.

Aspect 25 is the method of aspect 24, where the method may further include: updating or switching the ML model based on the ML model performance monitoring result.

Aspect 26 is the method of aspect 25, wherein updating or switching the ML model may include: in response to the ML model performance monitoring result indicating the ML model failure, deactivating the ML model or replacing the ML model with a substitute ML model.

Aspect 27 is the method of any aspects 17 to 26, where the ML model may include one or more layers of neural networks.

Aspect 28 is an apparatus for wireless communication at a network entity, including: a memory; and at least one processor coupled to the memory and, based at least in part on information stored in the memory, the at least one processor is configured to perform the method of any of aspects 17-27.

Aspect 29 is the apparatus of aspect 28, further including at least one of a transceiver or an antenna coupled to the at least one processor and configured to transmit the precoded pilot signal.

Aspect 30 is an apparatus for wireless communication including means for implementing the method of any of aspects 17-27.

Aspect 31 is a computer-readable medium (e.g., a non-transitory computer-readable medium) storing computer executable code, where the code when executed by a processor causes the processor to implement the method of any of aspects 17-27.

What is claimed is:

1. An apparatus for wireless communication at a user equipment (UE), comprising:

memory; and at least one processor coupled to the memory and, based at least in part on information stored in the memory, the at least one processor is configured to:

receive, from a network entity, a precoded pilot signal, the precoded pilot signal comprising a pilot signal that is precoded with a precoder based on a machine-learning (ML) model, wherein the precoder is based on reconstructed channel state information (CSI) for a channel between the UE and the network entity reconstructed by the ML model; and report an ML model performance monitoring result comprising a comparison between a target channel estimation and a reconstructed channel estimation for the channel between the UE and the network entity based on the precoded pilot signal.

2. The apparatus of claim 1, wherein the reconstructed channel estimation is based on a channel matrix and the reconstructed CSI, and the target channel estimation is based on the channel matrix and a target CSI.

3. The apparatus of claim 2, wherein the at least one processor is further configured to:

receive, from the network entity, a non-precoded pilot signal comprising the pilot signal without precoding with the precoder, wherein the channel matrix is based on the non-precoded pilot signal.

4. The apparatus of claim 2, wherein the at least one processor is further configured to:

determine the channel matrix prior to receiving the precoded pilot signal.

5. The apparatus of claim 1, wherein the at least one processor is further configured to:

estimate, based on the precoded pilot signal, the reconstructed channel estimation for the channel between the UE and the network entity; and monitor a performance of the ML model by comparing the reconstructed channel estimation with the target channel estimation of the channel.

6. The apparatus of claim 5, wherein to monitor the performance of the ML model, the at least one processor is configured to:

compute a first signal quality metric associated with a reconstructed CSI; and compute a second signal quality metric associated with a target CSI, wherein the comparison reported to the network entity includes the comparison of the first signal quality metric and the second signal quality metric.

7. The apparatus of claim 6, wherein the ML model performance monitoring result indicates an ML model failure based on a difference between the first signal quality metric and the second signal quality metric being greater than a quality threshold.

8. The apparatus of claim 7, wherein the at least one processor is further configured to:

update or switch the ML model in response to the ML model failure.

9. The apparatus of claim 1, wherein the at least one processor is further configured to:

transmit, to the network entity, a CSI feedback message, wherein the pilot signal is precoded based on the reconstructed CSI reconstructed by the ML model based on the CSI feedback message.

10. An apparatus for wireless communication at a network entity, comprising:

memory; and at least one processor coupled to the memory and, based at least in part on information stored in the memory, the at least one processor is configured to:

transmit, to a user equipment (UE), a precoded pilot signal comprising a pilot signal precoded with a precoder based on a machine-learning (ML) model, wherein the precoder is based on reconstructed channel state information (CSI) for a channel between the UE and the network entity reconstructed by the ML model; and receive, from the UE, an ML model performance monitoring result comprising a comparison between a target channel estimation and a reconstructed channel estimation for the channel between the UE and the network entity based on the precoded pilot signal.

11. The apparatus of claim 10, wherein the at least one processor is further configured to:

receive, from the UE, a CSI feedback message for the channel between the UE and the network entity; and precode the pilot signal based on the ML model at the network entity and the reconstructed CSI for the channel between the UE and the network entity, wherein the reconstructed CSI is generated by the ML model based on the CSI feedback message.

12. The apparatus of claim 11, wherein the reconstructed channel estimation is based on a channel matrix and a reconstruction of the CSI feedback message, and the target channel estimation is based on the channel matrix and a target CSI.

13. The apparatus of claim 12, wherein the at least one processor is further configured to:

transmit, to the UE, a non-precoded pilot signal comprising the pilot signal without the precoder, wherein the channel matrix is based on the non-precoded pilot signal.

14. The apparatus of claim 12, wherein the channel matrix is determined prior to transmitting the precoded pilot signal.

15. The apparatus of claim 12, wherein the ML model performance monitoring result comprises the comparison between a first signal quality metric associated with the reconstructed CSI and a second signal quality metric associated with the target CSI.

16. The apparatus of claim 15, wherein the ML model performance monitoring result indicates an ML model failure based on a difference between the first signal quality metric and the second signal quality metric being greater than a quality threshold.

17. The apparatus of claim 16, wherein the at least one processor is further configured to:

update or switch the ML model based on the ML model performance monitoring result.

18. A method for wireless communication at a user equipment (UE), comprising:

receiving, from a network entity, a precoded pilot signal, the precoded pilot signal comprising a pilot signal that is precoded with a precoder based on a machine-learning (ML) model, wherein the precoder is based on reconstructed channel state information (CSI) for a channel between the UE and the network entity reconstructed by the ML model; and reporting an ML model performance monitoring result comprising a comparison between a target channel estimation and a reconstructed channel estimation for the channel between the UE and the network entity based on the precoded pilot signal.

19. The method of claim 18, wherein the ML model based precoder is based on the reconstructed CSI for the channel between the UE and the network entity.

* * * * *